United States Patent [19]

Korner et al.

[11] 4,035,575

[45] July 12, 1977

[54] UNITARY RESINOUS PENETRATION ASSEMBLY

[75] Inventors: Renzo L. Korner, Horseheads, N.Y.;
James F. Quirk, Pittsburgh, Pa.;
Robert J. Colegrove, Horseheads;
David Green, Corning, both of N.Y.

[73] Assignee: Westinghouse Electric Corporation, Pittsburgh, Pa.

[21] Appl. No.: 526,290

[22] Filed: Nov. 22, 1974

[51] Int. Cl.² .................. G21C 13/02; H01B 17/26
[52] U.S. Cl. .............................. 174/11 R; 174/151
[58] Field of Search ....... 174/11 R, 18, 151, 152 R, 174/153 R; 176/87

[56] References Cited

U.S. PATENT DOCUMENTS

| 3,433,893 | 3/1969 | Hofmann et al. | 174/153 R |
| 3,495,028 | 2/1970 | Tutthill | 174/153 R |
| 3,708,612 | 1/1973 | Saxon et al. | 174/153 R X |
| 3,714,012 | 1/1973 | Herron | 174/152 R UX |
| 3,828,118 | 8/1974 | Bushek | 174/11 R |
| 3,882,262 | 5/1975 | Korner et al. | 174/11 R |

FOREIGN PATENT DOCUMENTS

| 1,340,207 | 9/1963 | France | 174/151 |
| 950,379 | 2/1964 | United Kingdom | 174/151 |

Primary Examiner—Laramie E. Askin
Attorney, Agent, or Firm—W. G. Sutcliff

[57] ABSTRACT

An electrical penetration module formed of a unitary resinous material about the electrical conductor, with the resinous material compressively sealed to the conductor along its length. Mounting means are integrally formed in the exterior surface of the unitary body for sealably mounting the penetration module through the containment.

3 Claims, 2 Drawing Figures

UNITARY RESINOUS PENETRATION ASSEMBLY

BACKGROUND OF THE INVENTION

The present invention relates to electrical penetrations which are utilized to sealingly bring electrical conductors through a nuclear containment.

A nuclear containment is the sealed shell within which radioactive material is designed to be contained in the event of a reactor vessel failure. The containment isolates the radioactivity from the outside environment. Numerous electrical conductors must be brought through the containment and effectively sealed thereto to withstand potential high temperature, radioactive exposure conditions etc.

The earliest penetration designs relied on ceramic-to-metal seals which were sealed in place through the metal shell portion of the containment. Such structures limit the flexibility of design, assembly, testing, and changes in the electrical conductor package. In the construction of a nuclear plant, it is necessary to test various components as they are completed within the containment, and to be able to charge the types of conductors being used in various penetration nozzles or apertures in which the penetration is disposed. Thus, at one stage of construction power cables are needed to be brought in via penetrations, while at other stages test as well as permanent instrumentation cables are necessarily brought through the containment.

Recent developments in penetrations have involved the use of resinous sealing material about and along the conductor in a stainless steel tubular body. The tubular body can then be mounted within a module which accommodates a plurality of such penetration devices, each of which may have several conductors sealed therethrough. A leak monitoring chamber has been provided within the penetration. Such devices are described in copending application Ser. No. 432,375, entitled "Modulator Electrical Penetration", filed Jan. 10, 1974, now U.S. Pat. No. 3,882,262 and owned by the assignee of this application.

An improved compressively sealed penetration and method of manufacture are set forth in copending application Ser. No. 471,738, entitled "Compression Sealing Penetration Elements Within A Resin Composition", filed May 20, 1974, also owned by the assignee of this application. The surface-to-volume ratios for a resinous casting to achieve an improved compressive seal between the resinous material and the conductor passing therethrough, are set forth in the aforementioned copending application.

SUMMARY OF THE INVENTION

An electrical penetration module for sealingly passing an electrical conductor through a containment wall, with an electrical conductor disposed within a unitary body of compressively sealed resinous material. The resinous material is chemically stable, radioactive resistant, and gas impervious. The unitary body of resinous material is compressively sealed to the conductor about and along the conductor. Mounting means are integrally formed in the exterior surface of the unitary body of resinous material for sealably mounting the penetration through the containment.

DESCRIPTION OF THE PREFERRED EMBODIMENTS

Figure 1:
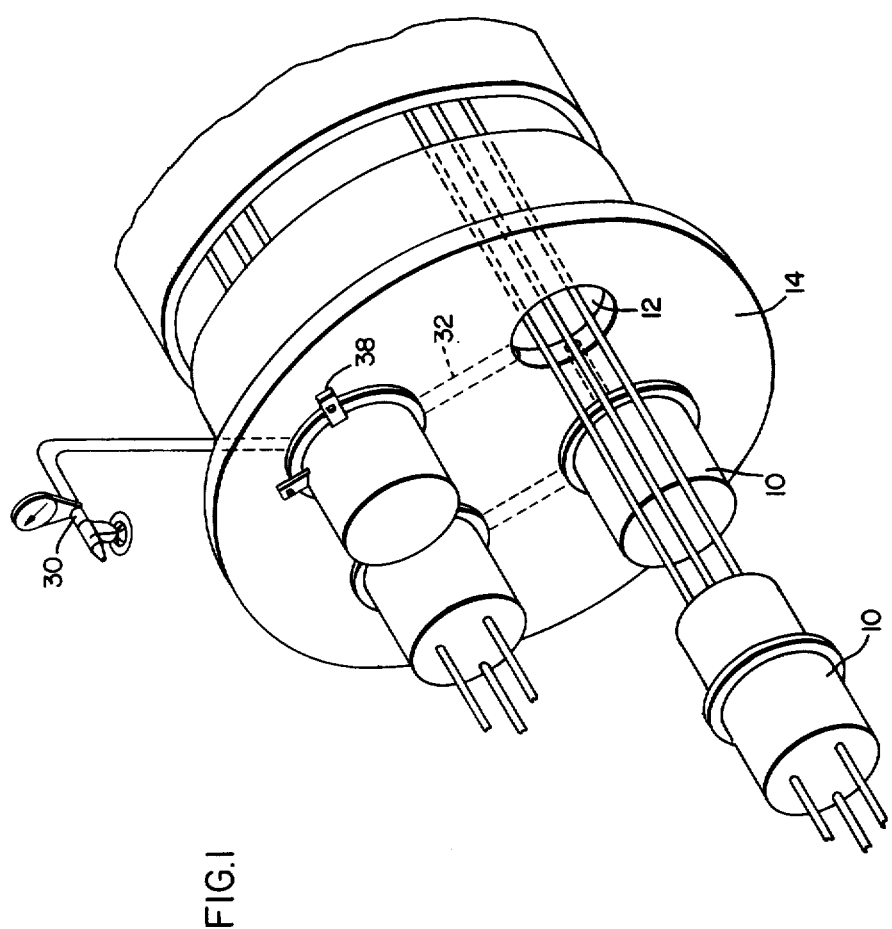
FIG. 1 is a perspective view of a modular penetration assembly of the present invention adapted to a sealing flange.

The invention can be best understood by reference to the exemplary embodiment seen in the drawings.

In FIG. 1, a plurality of electrical penetration modules 10 are in sockets 12 provided in a sealing flange 14 which is mountable on the penetration nozzle, not showing, which is an integral part of the containment wall of a reactor containment.

Figure 2:
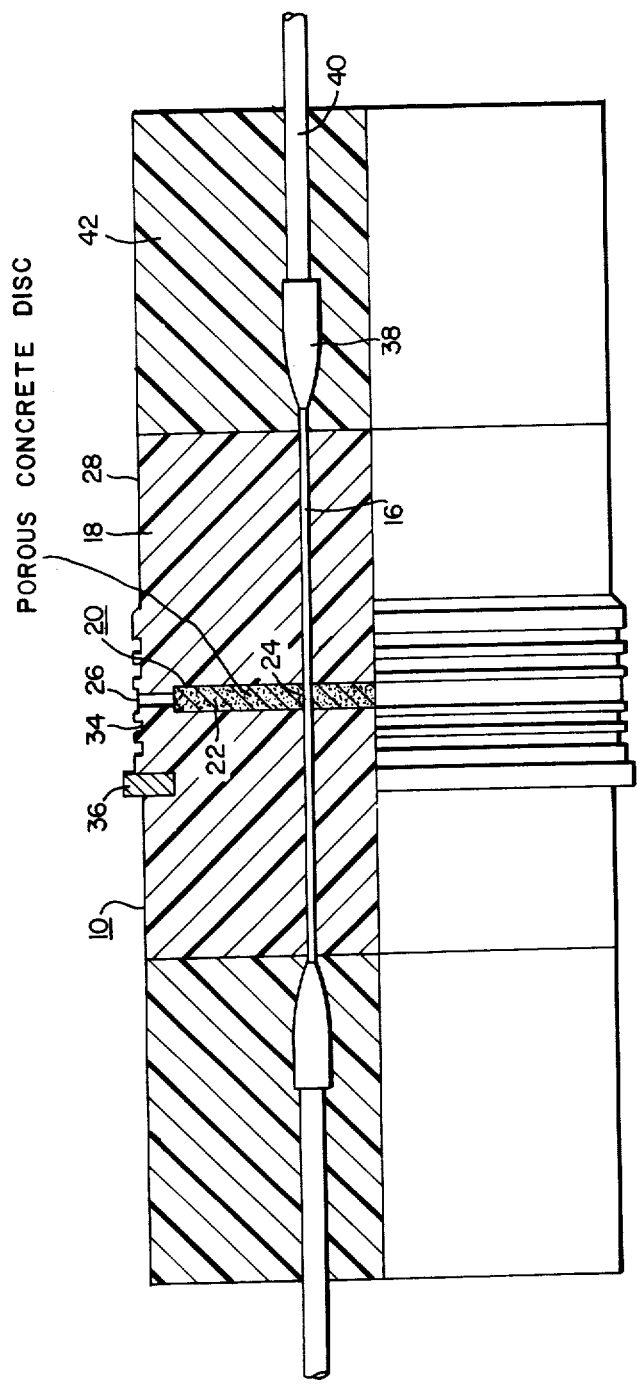
FIG. 2 is an elevational view partly in section of the penetration of the present invention.

The penetration module 10 is seen in greater detail in FIG. 2, with the upper half shown in cross section. The penetration module 10 comprises at least one elongated electrical conductor 16 which passes longitudinally through the module. Preferably, a plurality of conductors are employed, and three conductors are seen in FIG. 1 disposed in a symmetrical fashion. The size and number of conductors is a matter design, but as will be pointed out later, the design must satisfy certain criteria to achieve a compressive seal. The conductors 16 are compressively sealed within the unitary epoxy resin body 18 which is a compressive setting resinous material, which is gas impervious, chemically stable, and electrically insulating. The resinous body 18 is sealed about and along the length of the conductors. A centrally disposed leak monitoring means 20 may be disposed within the unitary epoxy resin body 18. The leak monitoring means 20 shown here is a porous cement disc 22 having apertures 24 through which the conductors 16 pass. An aperture channel 26 passes from the perimeter of the cement disc 22 to the exterior surface 28 of the resinous body 18. A leak detector means 30 is in communication with the aperture channel 26, as in FIG. 1 via a leak monitoring manifold 32 provided in the mounting flange 14. A plurality of O-ring receiving sealing grooves 34 are provided in the exterior surface 28 of the resinous body 18. The sealing grooves are disposed circumferentially about the body 18 on opposite sides of the central leak monitoring means 20. When the module is inserted into the socket 12 of the flange 14, the O-rings, not shown, are sealed against the socket wall. The sealing grooves 34 may be molded in place when the body 18 is formed or may be machined after the body is formed. A metal hold down ring 36 may be molded in place in the exterior surface 28 of body 18 and extending therefrom. The hold down ring 36 can then act as a bearing surface against which hold down clamps 38 bear in retaining the module 10 in place in the socket 12 of flange 14. The hold down ring should thus be disposed on the outboard side of the central portion of the module.

The electrical conductors 16 which extend from the ends of the unitary epoxy resin body 18 may be continued via connector means 38 and conductors 40 which are supported within supporting potting material 42 which interfaces with the end of unitary body 18.

The present design eliminates the need for any metal enclosure member and any seal between such metal enclosure and the seal material about the conductor. When a tubular metal enclosure member is utilized as in the prior art, the curing of the compressive setting epoxy resin causes the epoxy resin casting to shrink away from the interior surface of the metal enclosure member. In order to ensure a good seal it has been the practice to include an annular seal shroud within the cast epoxy body as taught in aforementioned copending application Ser. No. 432,375 now U.S. Pat. No. 3,882,262. The exterior surface of the annular seal shroud is compressively engaged by the epoxy resin cast to form a seal therealong as well as along the electrical conductors. The unitary epoxy resin penetration assembly of the present invention eliminates the need for weld seals between a metal enclosure and a seal shroud member, and is in general more easily and inexpensively fabricated.

The concrete disc 22 serves to support the conductors during casting of unitary resinous body 18. The details of preparing a resinous body which is compressively sealed about the conductors are set forth in the copending application Ser. No. 471,738. In order to have compressive collapse of the resin body about the conductor, the surface-to-volume ratio of the resin casting for a right circular cylindrical body should be maintained with a shape factor between 0.9 and 2.0 when the right circular cylinder dimensions are in inches. The shape factor is the ratio of total surface area to total volume. When the shape factor is maintained within the prescribed values, an exotherm core is maintained within the casting which is itself a heat source sufficient to cause an inward collapse of the exotherm core fluid during curing. This assures a good seal along the conductor. Such a compressive seal eliminates the need for special treatment of the conductor or specialized sealants other than the epoxy resin material itself.

A resinous material which can be used for unitary body 18 is formed from 100 parts by weight Epon Resin 815, 20 parts Curing Agent Z, both from the Shell Oil Co., and 280 parts by weight of ground silica filler. The conductor or conductors may be heated electrically to maintain the temperature of the exotherm core to assure compressive collapse of the epoxy resin composition about the surface of the penetration elements. Such conductor heating should be maintained below the temperature which would cause boiling of the resin composition.

The supporting potting material 42 need only structurally support the conductor extensions, there is no need for a compressive seal between the potting material 42 and the conductor connector 38 and extension 40. Any conventional potting material can be used including the resinous material used for the central unitary body 18.

The design of the present invention has been tested using Institute of Electronic and Electrical Engineers (IEEE) standards No. 98 and No. 101 to estimate the penetration thermal endurance. The penetration assembly was subjected to high temperatures of up to 200° C to simulate in-service thermal aging. The test samples were initially cycled several times from −30° C to 100° C before the high temperature aging test procedure. The epoxy resin used to manufacture the test specimens has a temperature index of 135° C. The average thermal life of the penetration seal, before a leak rate of greater than $1 \times 10^{-2}$ standard cubic centimeters per second was experienced was 125 hours at 200° C. Based on life tests to date the expected thermal life of the penetration at 150° C is about 1.5 years. The external silicone O-ring seals have a thermal life which exceeds the epoxy seal.

The penetration assembly of the present invention provides a highly reliable seal without the need for a stainless teel enclosure jacket. This all epoxy resin penetration assembly may be easily and inexpensively fabricated with a minimum of machining operations.

We claim:

1. An electrical penetration module for sealingly passing an electrical conductor through a containment wall comprising a right circular cylindrical unitary body of chemically stable, radioactive resistant, gas impervious compressive setting epoxy resin potting material disposed about a porous, concrete disc-like spacer leak monitoring means, with at least one electrical conductor extending longitudinally through the disc-like spacer and the cylindrical body about the spacer, which conductor is compressively sealed to the cylindrical body along a substantial portion of the body length, with an aperture channel provided in the cylindrical body from the embedded spacer to the exterior surface of the cylindrical body, with O-ring receiving grooves formed in the exterior surface of the cylindrical body on either side of the aperture channel for sealably mounting the module, and a metallic clamping ring embedded in the exterior surface of the cylindrical body extending about the cylindrical body on the outboard side of the leak monitoring means and the O-ring receiving grooves.

2. The electrical penetration module specified in claim 1, wherein electrical conductor supporting resinous potting extensions are provided at each end of the unitary body with the electrical conductor extending therethrough.

3. The electrical penetration module specified in claim 2, wherein said resinous potting extensions are generally cylindrical extensions of the right circular cylindrical unitary body.

* * * * *